Aug. 20, 1929.                J. HEIDENSTROM                1,725,188
WHEELED VEHICLE
Filed Nov. 16, 1926
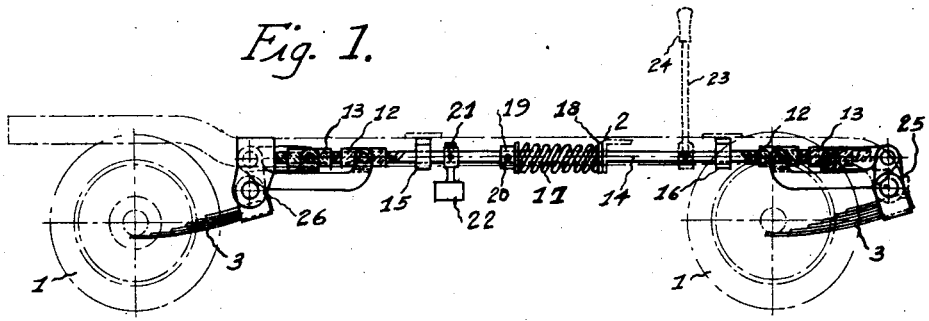
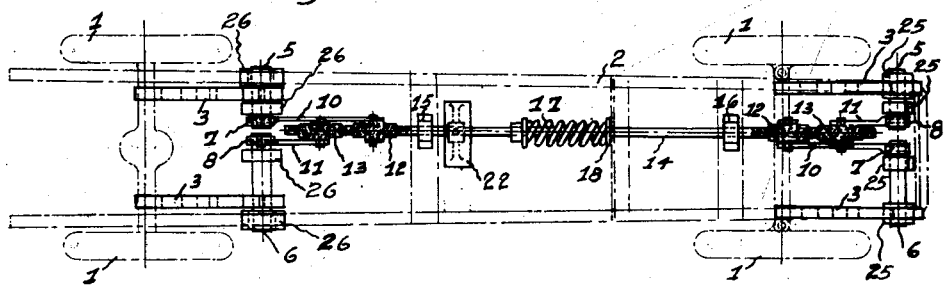
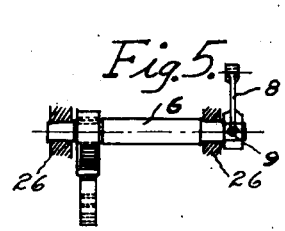
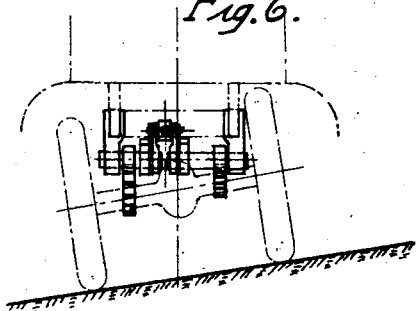
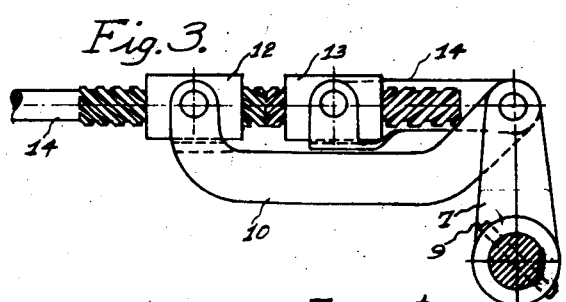

Patented Aug. 20, 1929.

1,725,188

UNITED STATES PATENT OFFICE.

JOHN HEIDENSTROM, OF SCHENECTADY, NEW YORK.

WHEELED VEHICLE.

Application filed November 16, 1926. Serial No. 148,743.

This invention relates generally to wheeled vehicles, and comprehends a novel construction and arrangement of springs to minimize the shocks and vibrations of the running gear from being transmitted to the vehicle body, thereby resulting in smoother riding and comfort to the occupants.

In carrying out the present invention I provide a vehicle spring adjacent each wheel of the vehicle, and utilize means for distributing the rebound of any one spring to all of the other of said springs, in a manner which permits the springs to absorb the shocks and jars of the running gear, so that the vehicle body is caused to move vertically in a horizontal plane on all of the springs simultaneously.

More specifically stated, the invention makes use of a plurality of cantilever springs arranged adjacent the wheels of the vehicles, all of which springs are connected by means including an equalizing spring which functions to automatically distribute to said springs the rebound of any particular spring, thereby preventing the vehicle body from wabbling or tilting from one side to the other incident to the vibrations of the running gear.

Another object of the invention resides in the provision of means for distributing the rebound of any one spring to all of the other of said springs, either automatically, or by use of a hand controlled lever arranged within convenient reach of the operator of the vehicle.

A further object of the invention resides in the provision of means for automatically maintaining the vehicle body in a true horizontal plane permitting the running gear to travel over inclined surfaces without causing the vehicle body to tilt or rock from one side to the other.

A still further object of the invention resides in the provision of means to prevent the vehicle from turning over while turning corners, or rounding curves, which means functions to automatically lower the side of the vehicle adjacent the inside of the curve, and raising the other side of the vehicle accordingly.

Other objects and advantages of the invention will be better understood when the following detailed description is read in connection with the accompanying drawing, the invention residing in the construction, combination and arrangement of parts as claimed.

In the drawing forming part of this application like numerals of reference indicate similar parts in the several views and wherein:

Figure 1 is a side elevation of the running gear of the vehicle showing the application of the invention.

Figure 2 is a bottom plan view.

Figure 3 is an enlarged fragmentary view showing the connection between the cantilever springs and the equalizing means.

Figure 4 is a side elevation of one of the cantilever springs and its associated parts.

Figure 5 is a view taken at a right angle to Figure 4.

Figure 6 is a view showing how the running gear is permitted to travel over inclined planes with the vehicle body maintained in a horizontal position.

Referring to the drawing in detail 1 indicates the wheels of the vehicle upon which is mounted the usual frame 2 forming part of the running gear.

As clearly shown in Figure 2, I make use of a vehicle spring adjacent each of the wheels 1, these springs being preferably of the cantilever type and indicated at 3. The springs 3 at the forward and rearward ends of the vehicle have their corresponding ends bearing against the adjacent axles as clearly shown in Figure 1, while the remaining ends of these springs are keyed to shafts indicated at 5 and 6 respectively. In other words there is one shaft 5 for each spring at the left side of the vehicle, and one shaft 6 for each spring at the right hand side of the vehicle as shown in Figure 2. The forward end of each spring is fixed to its adjacent shaft by means of a key 4, while rising from each shaft is a lever as shown in Figures 4 and 5. The lever for each shaft 5 is indicated at 8, while the lever for each shaft 6 is indicated at 7, and these levers form part of means constructed to distribute the rebound of any one spring to the other of said springs, with a view of minimizing the shocks and vibrations of the running gear from being transmitted to the vehicle body. This obviously results in smoother riding qualities for the vehicle and the comfort of the occupants.

For this purpose I employ a rod 14 which is arranged centrally and longitudinally of the vehicle frame 2, and is mounted for both sliding and rocking movements in suitable bearings indicated at 15 and 16 respectively. This rod is threaded for a portion of its length adjacent each end thereof, and each of said threaded portions is provided with right and left hand threads of any desired pitch. Adjustably mounted on each end of the rod 14 is a pair of nuts indicated at 12 and 13 respectively, the latter being mounted on the right hand threads while the nut 12 is mounted on the left hand threads as illustrated in Figure 3. The levers associated with the shafts 5 and 6 are connected with the nuts 12 and 13 through the instrumentality of links, the construction at both ends of the vehicle being the same as shown. In other words each lever 7 is connected by a link 10 with the nut 12, while each lever 8 is connected with the nut 13 by means of the link 11. Consequently the rod 14 is connected with all of the cantilever springs in a manner to call said springs into use upon the rebound of any one spring, thereby distributing the vibrations of the running gear to all of the springs for the purpose above stated. Surrounding this rod 14 is an equalizing spring 17, one end of which bears against a washer 18 engaging the cross member of the frame 2, while the other end of the equalizing spring 17 against the collar 19 secured to the rod by means of a cross pin 20. It might here be stated that the shafts 5 and 6 above mentioned, and to which the adjacent ends of the cantilever springs are keyed, are mounted in suitable bearings 25 and 26 depending from the frame 2.

In practice, should the spring 3 at the forward left hand corner of the frame 2 be called into use, the shock or jar to which the spring is subjected would be transmitted through the shaft 5, lever 8, link 11 and nut 13 to the rod 14, sliding the latter through its bearings 15 and 16 respectively, whereupon the shock is transmitted to the equalizing spring 17, and at the same time bring into use the remaining cantilever springs arranged about the frame. In this manner the vibrations of the running gear are distributed to all of the springs 3, so that as the equalizing spring 17 returns to its normal position, the cantilever springs cause the vehicle body to rise vertically and in a horizontal plane, thereby preventing rocking or wabbling of said body.

The rod 14 is as above stated mounted for rocking movement in its bearings 15 and 16 respectively, and is used in this manner for the purpose of maintaining the vehicle body in a horizontal plane, when the running gear assumes an angular position with relation to the ground, such as for instance when traveling over an inclined plane or surface as indicated in Figure 6. It is manifest that when the rod 14 is turned in its bearings, the nuts 12 and 13 move either toward or away from each other at each end of the rod, depending of course upon the direction of rotation of the rod 14. The rod may be turned automatically by means of a pendulum weight 22 suspended from the rod at an appropriate point in its length as illustrated in Figure 1; or it may be turned through the instrumentality of a manually operable lever 23 provided with a handle or the like 24. If desired the lever 23 may also be used in connection with the pendulum weight without departing from the inventive idea. However, independently of how the rod 14 is turned, it is manifest that when the rod is turned to the right the nuts 12 and 13 at each end of the rod move toward each other, with a result that the right hand side of the vehicle is slightly lowered and the left hand side of the vehicle correspondingly raised, thereby maintaining the vehicle in a true horizontal position, with the running gear arranged at an angle to the ground when traveling over inclined surfaces. This is clearly illustrated in Figure 6, wherein it will be noted that as the vehicle travels over an inclined surface tilting the running gear as shown, the pendulum weight 22 swings to the left turning the rod 14 to the right, and thereby adjusting the nuts 12 and 13 toward each other on the opposite ends of the rod. As the nuts move in this direction, the links 10 and 11 move in opposite directions, and control the levers 7 and 8 on the shafts 5 and 6 to slightly lower one side of the vehicle and correspondingly raise the other side thereof.

This same operation takes place when rounding corners or turning curves, to prevent the vehicle from tipping over, thus materially adding to the stability and safety of the vehicle as will be readily appreciated. For instance should the vehicle be turned to the left, the pendulum weight 22 would swing to the right by centrifugal force, thereby turning the rod 14 to the left. As above stated the rod may be turned in this manner through the instrumentality of the hand lever 23, or the same may be used together with the pendulum weight 22. However, when the rod 14 is turned to the right, the nuts 12 and 13 on the opposite ends of the said rod move away from each other, with the result that the left hand side of the vehicle body is lowered and the right hand side correspondingly raised, to prevent the vehicle from tilting or turning over while making the turn. Should the vehicle make a right hand turn, the pendulum weight swings to the left turning the rod 14 in a direction to cause the nuts 12 and 13 to move toward each other, thereby lowering the right hand side of the vehicle body and accordingly raising the left hand side thereof. So it is manifest that by reason of the construction and arrangement shown and described, when the vehicle is turned in either direction in rounding corners or curves, that side of the vehicle next to the inside of the curve is always lowered a slight distance and the other side slightly raised.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In a vehicle, a wheeled frame, springs arranged adjacent the wheels thereof, a rod mounted in said frame adjacent and substantially parallel to the longitudinal axis thereof and capable of both rocking and longitudinal movement with relation thereto, an operative connection between an end of each of said springs and said rod whereby the rebound of any of said springs will tend to impart a rocking movement to the rod and thereby transmit said rebound to the other springs.

2. In a vehicle, a wheeled frame, springs arranged adjacent the wheels thereof, a rod mounted in said frame and parallel to the longitudinal axis thereof and capable of both rocking and longitudinal movement in relation thereto, an operative connection between an end of each of said springs and said rod whereby the rebound of any of the springs will tend to impart a rocking movement to the rod and thereby transmit said rebound to the other springs; and a spring associated with said rod and adapted to resist longitudinal movement thereof in one direction and to urge longitudinal movement thereof in the opposite direction.

3. In a vehicle, a wheeled frame, cantilever springs arranged adjacent the wheels thereof, a shaft keyed to the forward end of each of said springs, mountings for said shafts, a rod mounted for movement longitudinally of the frame, means connecting said shafts with the adjacent ends of said rod, and an equalizing spring associated with said rod, whereby the rebound of one spring is simultaneously transmitted to the other springs.

4. In a vehicle, a wheeled frame, cantilever springs arranged adjacent the wheels thereof, a shaft keyed to the forward end of each spring, mountings for said shafts, a lever carried by each shaft, a rod mounted for movement longitudinally of the frame, means connecting the levers with the opposed ends of said rod, and an equalizing spring associated with said rod, whereby the rebound of one spring is simultaneously transmitted to the other springs.

5. In a vehicle, a wheeled frame, cantilever springs arranged adjacent the wheels thereof, a rod arranged longitudinally of the frame and mounted for both sliding and rocking movements, means connecting the forward ends of the cantilever springs with said rod, an equalizing spring associated with said rod whereby the rebound of any one spring is simultaneously transmitted to the other of said springs, said means oppositely flexing said springs in pairs at the sides of the rod incident to the rotation thereof, to maintain the body of the vehicle in a horizontal plane upon an inclined surface, and means for rotating said rod in either direction.

6. In a vehicle, a wheeled frame, cantilever springs arranged adjacent the wheels thereof, means connecting the forward ends of said springs for transmitting the rebound of any one spring to the other of said springs, and also oppositely flexing said springs in pairs at the sides of the vehicle, said means including a rod arranged longitudinally of the frame and mounted for both sliding and rocking movements, and means for rocking said rod in either direction for the purpose described.

7. In a vehicle, a wheeled frame, cantilever springs arranged adjacent the wheels thereof, means connecting the forward ends of said springs for transmitting the rebound of any one spring to the other of said springs, and also oppositely flexing said springs in pairs at the sides of the vehicle, said means including a rod arranged longitudinally of the frame and mounted for both sliding and rocking movements, and means for automatically rocking said rod in either direction.

8. In a vehicle, a wheeled frame, cantilever springs arranged adjacent the wheels thereof, means connecting the forward ends of all of said springs, whereby the rebound of any one spring is transmitted to the other springs, and the springs at the opposite sides of the vehicle flexed in pairs and in opposite directions, whereby one side of the vehicle body is lowered and the other side raised, said means including a rod arranged longitudinally of the frame and mounted for both sliding and rocking movements, and a pendulum weight suspended from said rod for automatically rocking the latter in either direction.

9. In a vehicle, a wheeled frame, springs arranged in pairs at the forward and rear ends of the frame, means connecting an end of all of said springs whereby the rebound of any one spring is transmitted to the others and including a rockable part, rocking movement whereof will oppositely flex the springs in each pair, and a weight tending to prevent rocking movement of said part.

10. In a vehicle, a wheeled frame, springs arranged in pairs at the forward and rear ends of the frame, means connecting an end of all of said springs whereby the rebound of any one is transmitted to the others and including a rockable part, rocking movement whereof will oppositely flex the springs in each pair, a weight normally tending to prevent rocking movement of said part, and a lever whereby said part may be rocked manually in opposition to said weight.

11. In a vehicle, a wheeled frame, cantilever springs arranged in pairs at the forward and rearward ends of the frame, a rod arranged longitudinally of the frame and mounted for both sliding and rocking movements, means connecting the forward ends of said springs with the adjacent ends of said rod, whereby the rebound of any one spring is transmitted to the other springs incident to the sliding movement of said rod, and oppositely flexing said springs in pairs at the sides of the rod incident to the rocking movement thereof, an equalizing spring associated with said rod and used in the distribution of the rebound of any one of said springs, and means for automatically rocking said rod in either direction for the purpose specified.

12. In a vehicle, a wheeled frame, cantilever springs arranged in pairs at the forward and rearward ends of the frame, a rod arranged longitudinally of the frame and mounted for both sliding and rocking movements, a shaft keyed to the forward end of each spring, mountings for said shafts, levers carried by said shafts, means connecting said levers with the opposed ends of said rod, whereby the rebound of any one spring is simultaneously transmitted to the other springs, incident to the sliding movement of said rod, and said springs oppositely flexed in pairs at the sides of the frame incident to the rotation of said rod, an equalizing spring associated with said rod for the equal distribution of rebound from any one of said springs, and means for automatically rocking said rod in either direction.

13. In a vehicle, a wheeled frame, cantilever springs arranged at the opposed ends of the frame, a shaft keyed to the forward end of each spring, mountings for said shafts, a lever carried by each shaft, a rod arranged longitudinally of the frame and mounted for both sliding and rocking movements, each end of the rod having right and left hand threads, nuts associated with said threads, links connecting each lever with one of said nuts, an equalizing spring associated with said rod, whereby the rebound of any one spring is simultaneously transmitted to the other springs incident to the sliding movement of said rod, and said springs oppositely flexed in pairs at the sides of the frame incident to the rocking movements of said rod for the purposes specified, and means for automatically rocking said rod in either direction.

14. In a vehicle, a wheeled frame, cantilever springs arranged at the opposed ends of the frame, a rod arranged longitudinally of the frame and mounted for rocking movements, means connecting the forward ends of the springs with said rod, whereby said springs are flexed in pairs at the opposite sides of the frame to simultaneously lower one side of the vehicle body and raise the other side thereof incident to the rocking movements of said rod, and means for automatically rocking said rod in the proper direction when the vehicle travels on an inclined surface or rounds a curve.

In testimony whereof I have affixed my signature.

JOHN HEIDENSTROM.